(12) United States Patent
Kato et al.

(10) Patent No.: US 11,401,726 B2
(45) Date of Patent: Aug. 2, 2022

(54) BASE ISOLATION UNIT AND BASE ISOLATION APPARATUS

(71) Applicant: Mitsubishi Electric Corporation, Tokyo (JP)

(72) Inventors: Atsushi Kato, Tokyo (JP); Junji Takaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/269,260

(22) PCT Filed: Jul. 18, 2019

(86) PCT No.: PCT/JP2019/028348
§ 371 (c)(1),
(2) Date: Feb. 18, 2021

(87) PCT Pub. No.: WO2020/084848
PCT Pub. Date: Apr. 30, 2020

(65) Prior Publication Data
US 2021/0164254 A1    Jun. 3, 2021

(30) Foreign Application Priority Data
Oct. 23, 2018  (JP) .............................. JP2018-198948

(51) Int. Cl.
*E04H 9/02*  (2006.01)
*F16F 15/023*  (2006.01)
*F16F 7/00*  (2006.01)

(52) U.S. Cl.
CPC ........... *E04H 9/021* (2013.01); *F16F 15/023* (2013.01); *F16F 7/00* (2013.01)

(58) Field of Classification Search
CPC combination set(s) only.
See application file for complete search history.

(56) References Cited

U.S. PATENT DOCUMENTS 5,538,373 A * 7/1996 Kirkham ............... B25J 17/0216
                                                        409/145
5,940,180 A * 8/1999 Ostby ................. B23Q 17/2495
                                                        356/498

(Continued)

FOREIGN PATENT DOCUMENTS

JP    2008-175266 A    7/2008
WO    2017/056265 A1   4/2017

OTHER PUBLICATIONS

International Search Report and Written Opinion dated Aug. 13, 2019, received for PCT Application PCT/JP2019/028348, Filed on Jul. 18, 2019, 7 pages including English Translation.

*Primary Examiner* — Monica E Millner
(74) *Attorney, Agent, or Firm* — Xsensus LLP

(57) ABSTRACT

A base isolation unit comprises a first connector and a second connector disposed in a direction of base isolation with a predetermined distance therebetween, and a movement regulator provided between the first connector and the second connector and receiving an external force in the direction of base isolation. The movement regulator includes a first casing having one end connected to the first connector, a second casing having one end connected to the second connector, a first damping device accommodated inside the first casing, a second damping device accommodated inside the second casing, a vibration damper provided between the first casing and the second casing, and a coupling member coupling the first damping device and the second damping device together. The first damping device and the second damping device each have a cylinder, a compressible fluid and a piston.

6 Claims, 8 Drawing Sheets

(56) References Cited

U.S. PATENT DOCUMENTS

| | | | |
|---|---|---|---|
| 2004/0000215 A1* | 1/2004 | Phillips | F16F 15/0232 248/559 |
| 2010/0053589 A1* | 3/2010 | Hashemi | G03F 7/709 248/560 |
| 2010/0072010 A1 | 3/2010 | Aramizu | |
| 2014/0312198 A1* | 10/2014 | Martinez | F16F 15/022 267/140.11 |
| 2018/0283487 A1 | 10/2018 | Hattori et al. | |

* cited by examiner

FIG.5
(a)
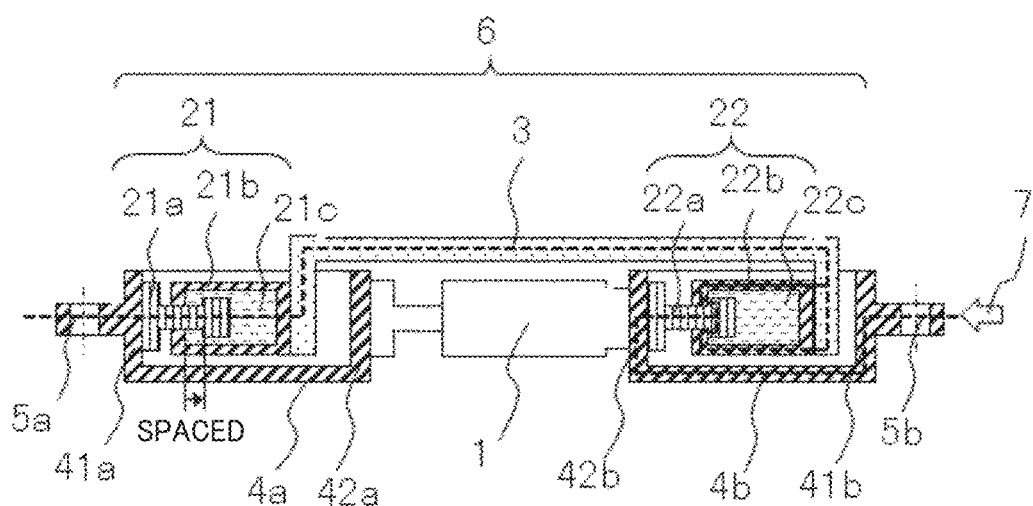
(b)
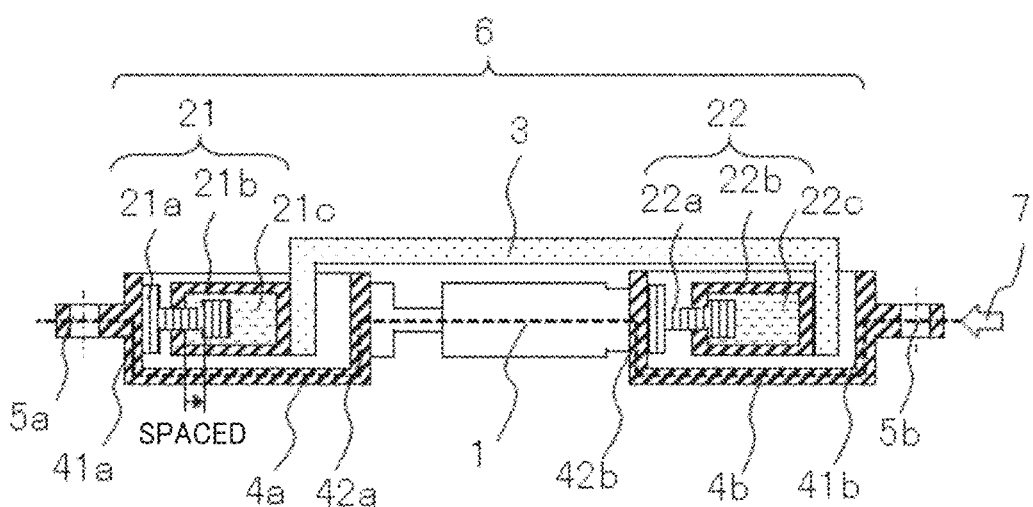

FIG.6
(a)
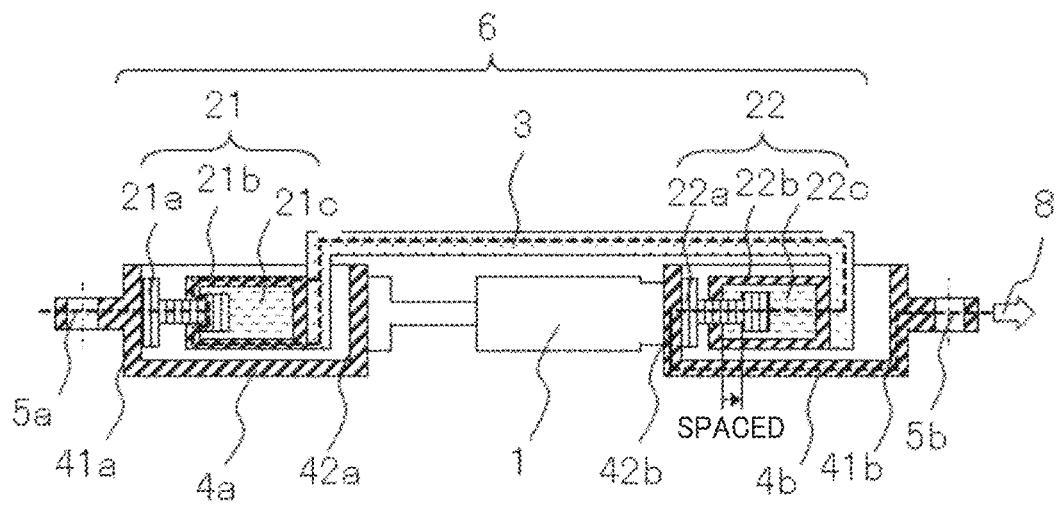
(b)
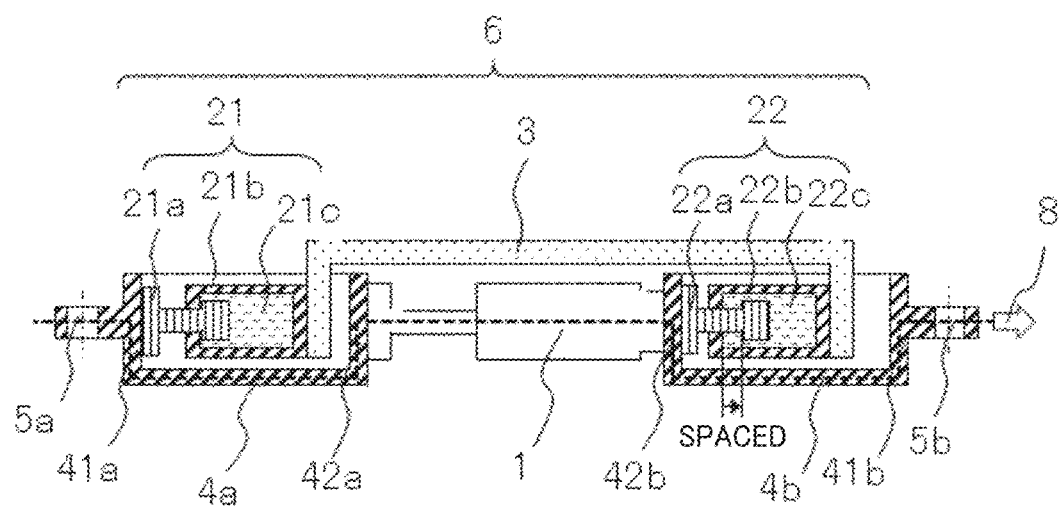

BASE ISOLATION UNIT AND BASE ISOLATION APPARATUS

CROSS-REFERENCE TO RELATED APPLICATIONS

The present application is based on PCT filing PCT/JP2019/028348, filed Jul. 18, 2019, which claims priority to JP 2018-198948, filed Oct. 23, 2018, the entire contents of each are incorporated herein by reference.

TECHNICAL FIELD

The present disclosure relates to a base isolation unit and a base isolation apparatus for preventing transmission of seismic vibration to structures and/or instruments.

BACKGROUND ART

A base isolation unit or a base isolation apparatus is installed between a base and a structure, an instrument or a similar object to be isolated from vibration for isolating the object from the base when an earthquake occurs. Resultant effects are prevention of transmission of seismic vibration from the base to the object to be isolated, and mitigation of an acceleration applied to the object when an earthquake occurs. One such base isolation unit can be used repeatedly in response to repeatedly occurring earthquakes even in environments without electricity and thus achieve isolation from seismic vibration while keeping stiffness in conditions other than earthquakes (for example, see PTL 1). PTL 1 discloses a base isolation unit having a preloaded spring unit composed of a preloaded resilient body. This base isolation unit does not vary a spacing when the preloaded spring unit receives external force equal to or smaller than the preload, whereas the base isolation unit varies the spacing when the preloaded spring unit receives external force exceeding the preload. PTL 1 discloses in FIG. 1 or 13 a preloaded spring unit using a disc spring stack or a coil spring as the resilient body.

As a shock absorbing member that does not operate in response to a small load but operates in response to a large load, there is a liquid pressure spring using a compressible liquid (for example, see PTL 2). According to PTL 2, when an external force exceeding a predetermined value is received, a piston rod enters a cylinder, and the cylinder has an internal volume reduced to be smaller than an internal volume that the cylinder initially has. This increases the pressure of the compressible fluid sealed inside the cylinder. The increased pressure acts as a counterforce to generate a resilient effect, and also dampens and absorbs energy applied as the fluid is compressed and recovers.

CITATION LIST

Patent Literature

PTL 1: WO 2017/056265
PTL 2: Japanese Patent Laid-Open No. 2008-175266

SUMMARY OF INVENTION

Technical Problem

However, the preloaded spring unit of the base isolation unit disclosed in FIG. 1 or 13 of PTL 1 uses a disc spring stack or a coil spring as a resilient body. When such a preloaded spring unit receives an external force exceeding the preload and has the disc spring or coil spring compressed and deformed, and the compressed and deformed spring returns to the initial position, a rapid change in load occurs. Therefore, there is a problem, that is, a large impact load is generated between an arm connected to the disc spring or the coil spring and the casing. The liquid pressure spring disclosed in PTL 2 has a damping function, and can suppress an impact load to be small when the spring returns to its initial position. Note, however, that, due to its structure, while the liquid pressure spring operates in response to compressive external force as it compresses the internal fluid, the liquid pressure spring does not operate in response to tensile force as the piston comes into contact with the cylinder. Therefore, in order to apply the liquid pressure spring to the base isolation unit and cause the liquid pressure spring to operate, there is a concern, that is, an appropriate number of liquid pressure springs must be disposed in an appropriate direction.

The present disclosure has been made in order to solve the above-described problems, and an object thereof is to provide a base isolation unit capable of achieving isolation from seismic vibration while keeping stiffness in conditions other than earthquakes, that can minimize an impact load generated during recovery, and a base isolation apparatus.

Solution to Problem

According to the present disclosure, a base isolation unit comprises: a first connector and a second connector disposed in a direction of base isolation with a predetermined distance therebetween; and a movement regulator provided between the first connector and the second connector and receiving an external force in the direction of base isolation, the movement regulator including a first casing having one end connected to the first connector, a second casing having one end connected to the second connector, a first damping device accommodated inside the first casing, a second damping device accommodated inside the second casing, a vibration damper provided between the first casing and the second casing and generating a force in a direction to decrease the distance between the first connector and the second connector when the distance increases and generating a force in a direction to increase the distance when the distance decreases, and a coupling member coupling the first damping device and the second damping device together, the first and second damping devices each having a cylinder having opposite ends closed, a compressible fluid sealed inside the cylinder and preloaded, and a piston penetrating through one end of the cylinder, having one end located inside the cylinder and the other end located outside the cylinder, and raising the fluid in pressure as the piston enters the cylinder, the first and second damping devices having their respective cylinders connected to the coupling member, the other end of the piston of the first damping device being connected to the one end of the first casing, the other end of the piston of the second damping device being connected to the other end of the second casing.

Advantageous Effects of Invention

According to the present disclosure, a base isolation unit capable of achieving isolation from seismic vibration while keeping stiffness in conditions other than earthquakes, that can minimize an impact load generated during recovery, and a base isolation apparatus, can effectively be provided.

BRIEF DESCRIPTION OF DRAWINGS

FIG. 5 shows a load transmission path when an external force acts in a direction to compress the base isolation unit according to the first embodiment of the present disclosure.

FIG. 6 shows a load transmission path when an external force acts in a direction to tension the base isolation unit according to the first embodiment of the present disclosure.

DESCRIPTION OF EMBODIMENTS

Hereinafter, embodiments of the present invention will be described in detail with reference to the drawings. In the figures, identical or equivalent components are identically denoted and will not be described redundantly.

First Embodiment

Figure 1:
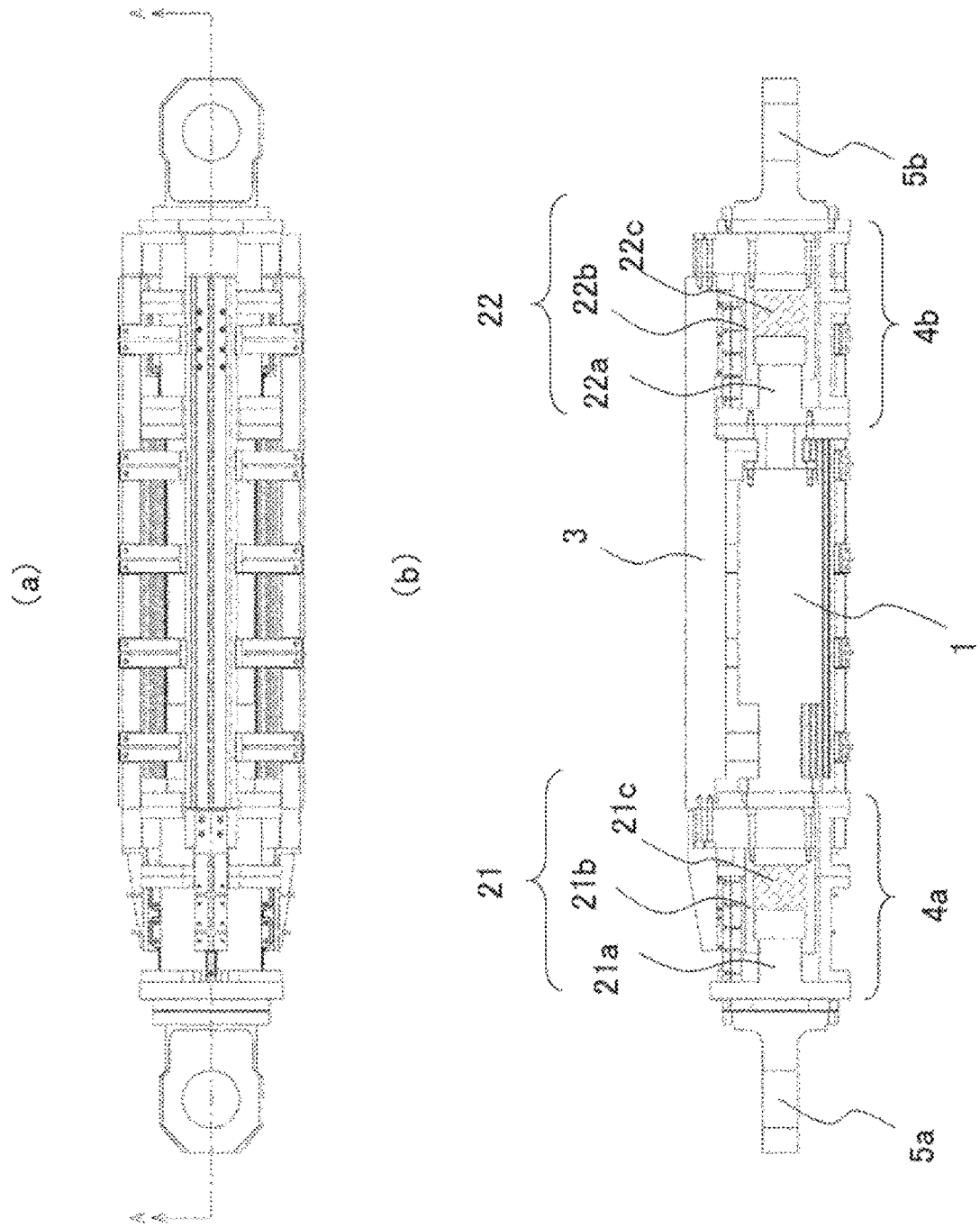
FIG. 1 schematically shows a base isolation unit according to a first embodiment of the present disclosure.
Figure 2:
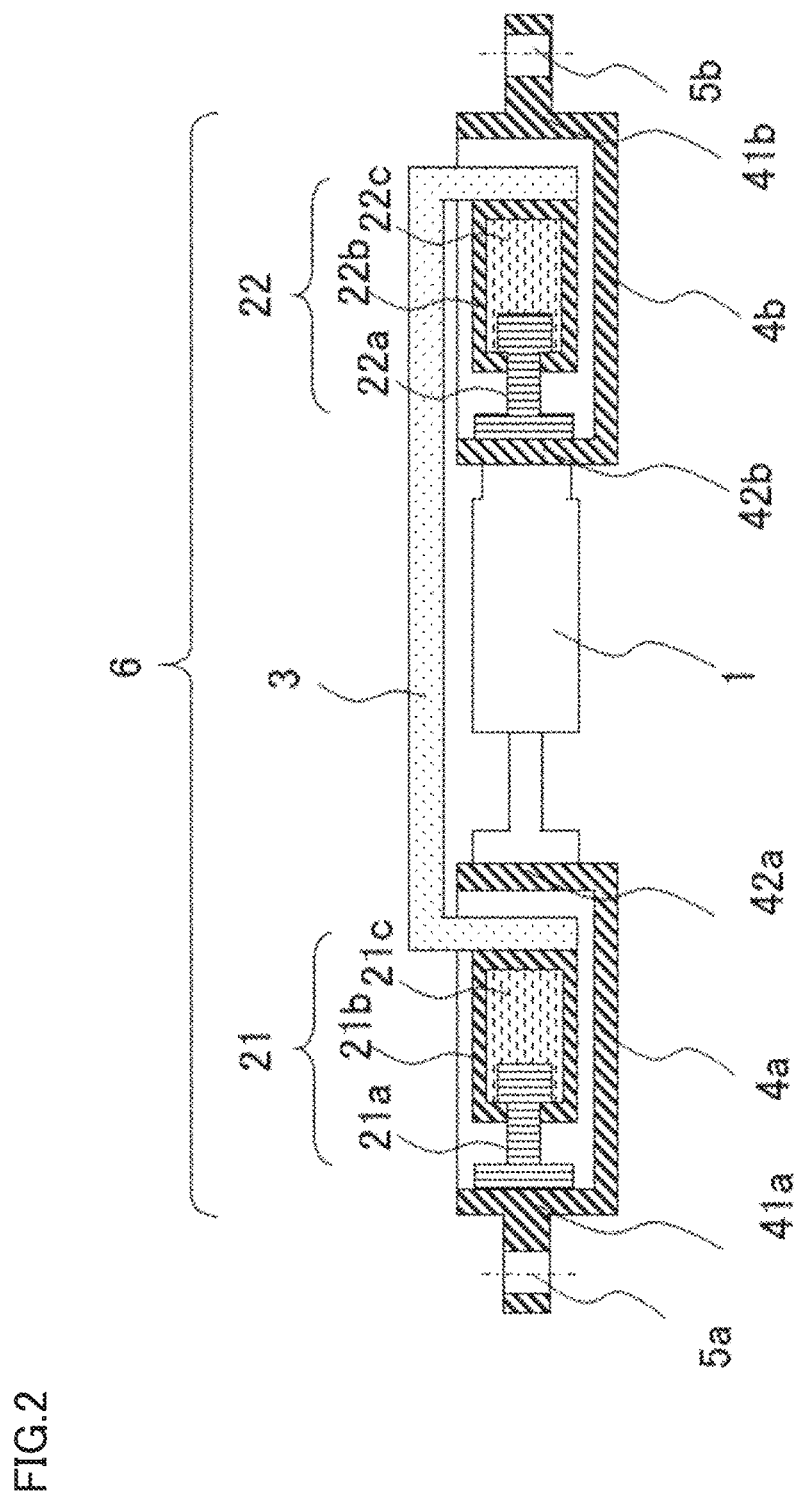
FIG. 2 is a cross section for illustrating how the base isolation unit according to the first embodiment of the present disclosure is structured and operates.

According to the present embodiment, a base isolation unit is applied for example between a pedestal on which a large telescope to be isolated from vibration is mounted and the ground which is a base. FIG. 1(a) is a schematic plan view of a base isolation unit according to the first embodiment of the present disclosure. FIG. 1(b) is a schematic cross section of the base isolation unit shown in FIG. 1 taken along a line A-A. FIG. 2 is a cross section for illustrating how the base isolation unit shown in FIG. 1(a) is structured and operates.

As shown in FIG. 2, the base isolation unit mainly comprises a first connector 5a connected to an object to be isolated from vibration, a second connector 5b that is a vibration-source connector connected to a structure subjected to seismic vibration, and a movement regulator 6. First connector 5a and second connector 5b are disposed in a direction in which isolation from vibration is done, hereinafter referred to as a direction of base isolation, with a predetermined distance therebetween. Movement regulator 6 is disposed between first connector 5a and second connector 5b. As seen in the direction of base isolation, movement regulator 6 has one end connected to first connector 5a and the other end connected to second connector 5b. Movement regulator 6 allows second connector 5b to move such that a distance between first connector 5a and second connector 5b varies when an external force exerted from first connector 5a and second connector 5b in the direction of base isolation exceeds a threshold value. That is, movement regulator 6 is a unit that can extend and contract in the direction of base isolation.

Movement regulator 6 includes a first casing 4a, a second casing 4b, a first damping device 21, a second damping device 22, a vibration damper 1, and a coupling member 3. First and second connectors 5a and 5b are located at opposite ends, respectively, of the base isolation unit, and first casing 4a, first damping device 21 accommodated in first casing 4a, vibration damper 1, second casing 4b, and second damping device 22 accommodated in second casing 4b are aligned therebetween in a straight line in the direction of base isolation. Coupling member 3 couples first and second damping devices 21 and 22 together.

As shown in FIG. 2, first casing 4a and second casing 4b are disposed on opposite sides of vibration damper 1 in the direction of base isolation. First damping device 21 is accommodated in first casing 4a. Second damping device 22 is accommodated in second casing 4b.

First casing 4a and second casing 4b each have a cylindrical shape with opposite ends closed. First casing 4a has one end, or an end 41a, connected to first connector 5a, and the other end, or an end 42a, connected to vibration damper 1. Second casing 4b has one end, or an end 41b, connected to second connector 5b, and the other end, or an end 42b, connected to vibration damper 1. First and second connectors 5a and 5b are each composed for example of a metal fitting for a cylinder, such as a clevis. Thus, first casing 4a, vibration damper 1, and second casing 4b are aligned in a straight line between first connector 5a and second connector 5b. While first casing 4a is connected to first connector 5a and second casing 4b is connected to second connector 5b in this embodiment, they may be connected vice versa. That is, first casing 4a may have one end, or end 41a, connected to second connector 5b, and the other end, or end 42a, connected to vibration damper 1. Second casing 4b may have one end, or end 41b, connected to first connector 5a, and the other end, or end 42b, connected to vibration damper 1.

Vibration damper 1 is a damping device that generates a resistive force depending on a moving speed to dampen received vibration. From a different point of view, vibration damper 1 generates a force in a direction to decrease a distance between first connector 5a and second connector 5b when the distance increases, and vibration damper 1 generates a force in a direction to increase the distance when the distance decreases. Vibration damper 1 can be any well-known damping device, and herein it is a viscous damper. Vibration damper 1 has one end connected to the other end of first casing 4a, or end 42a. Vibration damper 1 has the other end connected to the other end of second casing 4b, or end 42b.

First damping device 21 includes a cylinder 21b, a compressible fluid 21c, and a piston 21a. Fluid 21c is sealed inside cylinder 21b and also preloaded. Piston 21a is located inside cylinder 21b so as to reciprocate as desired. Piston 21a is composed of a piston head and a piston rod. The piston head is located inside cylinder 21b. The piston rod penetrates one end of cylinder 21b, and has an end outside the cylinder. That is, piston 21a has one end inside cylinder 21b and the other end outside cylinder 21b.

How first damping device 21 operates will be described. When piston 21a is pressed by a force exceeding the preload force applied to fluid 21c, the piston head is separated from an end of cylinder 21b that is penetrated by the piston rod. Piston 21a enters cylinder 21b, and cylinder 21b has an internal volume reduced to be smaller than an internal volume that cylinder 21b initially has. This compresses fluid 21c sealed inside cylinder 21b and thus increase its pressure. The increased pressure acts as a counterforce to generate a resilient effect, and also dampens and absorbs energy applied as fluid 21c is compressed and recovers. When the force that presses piston 21a is eliminated, piston 21a is returned to its original, initial position by the counterforce of fluid 21c compressed. When tensile force is applied to piston 21a, piston 21a does not move as the piston head is in contact with the end of cylinder 21b penetrated by the piston rod.

As well as first damping device 21, second damping device 22 has a cylinder 22b having opposite ends closed, a compressible fluid 22c sealed inside cylinder 22b and preloaded, and a piston 22a, and has the same configuration as first damping device 21.

Thus, first and second damping devices 21 and 22 are configured to have a damping force to alleviate an impact load in addition to a resilient force to return to an initial position piston 21a (22a) that has operated as it was pressed by a force. Further, setting a preload applied to fluid 21c (22c) inside cylinder 21b (22b) can prevent piston 21a (22a) from moving in response to a small load and allows piston 21a (22a) to be moved once a large load has been applied. That is, a configuration can be provided to have large stiffness when a pressing force equal to or smaller than the preload is applied in the direction of a main axis of first and second damping devices 21 and 22, and small stiffness when a pressing force exceeding the preload is applied.

It is desirable that the preload force applied to first and second damping devices 21 and 22 be designed to have a value larger than a load that normally acts on the base isolation unit so that large stiffness is provided when a base isolation function is not activated. That is, first and second damping devices 21 and 22 preferably have a relationship between load and displacement as shown in FIG. 3.

Figure 3:
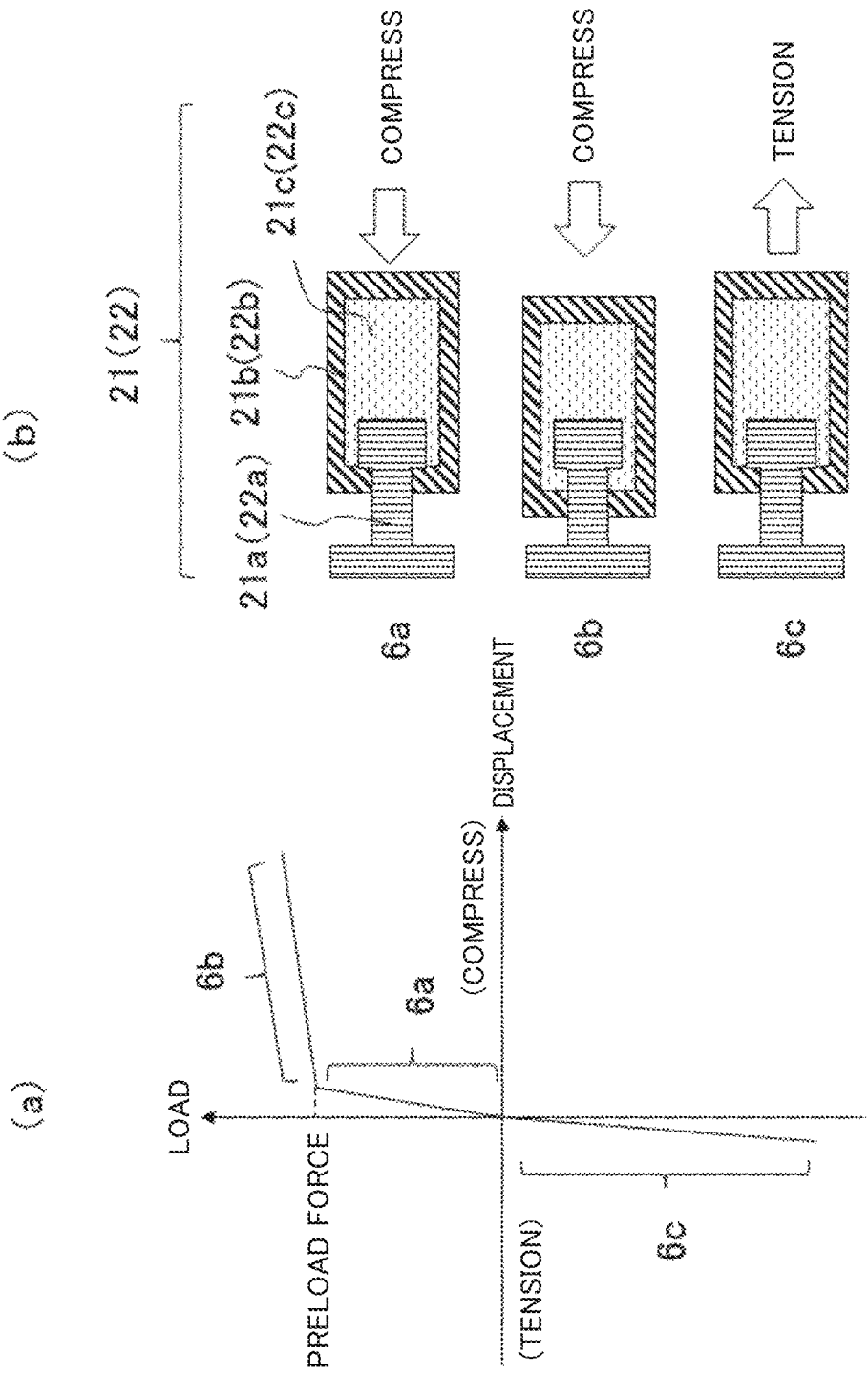
FIG. 3 is a graph representing a relationship between load and displacement in a first damping device and a second damping device of the base isolation unit according to the first embodiment of the present disclosure.

FIG. 3 is a graph representing a relationship between load and displacement in first and second damping devices 21 and 22. In FIG. 3(a), the axis of abscissas represents displacement in distance between one end of cylinder 21b (22b) and the piston head of piston 21a (22a) in first and second damping devices 21 and 22. The axis of ordinates represents a load applied to first and second damping devices 21 and 22. The upper side of the axis of ordinates represents compressive load, and the lower side of the axis of ordinates represents tensile load. The distance between one end of cylinder 21b (22b) and the piston head of piston 21a (22a) is assumed to be a displacement of zero in a normal state that is an initial position. FIG. 3(b) shows states of first and second damping devices 21 and 22 in a region 6a, a region 6b, and a region 6c shown in FIG. 3(a). Region 6a represents a case where a compressive load equal to or smaller than the preload force acts on first and second damping devices 21 and 22. Region 6b represents a case where a compressive load exceeding the preload force acts on first and second damping devices 21 and 22. Region 6c represents a case where a tensile load acts on first and second damping devices 21 and 22.

As shown in regions 6a and 6c in FIG. 3(a), when a load smaller than a prescribed preload force is applied, the stiffness of first and second damping devices 21 and 22 is dominant, and displacement increases/decreases in an extremely small amount with respect to variation in load. In contrast, as shown in region 6b in FIG. 3(a), when a load larger than the prescribed preload force is applied, displacement increases/decreases in a relatively large amount with respect to variation in load.

First damping device 21 is accommodated inside first casing 4a and has one end connected to first casing 4a and the other end connected to coupling member 3. Second damping device 22 is accommodated inside second casing 4b and has one end connected to second casing 4b and the other end connected to coupling member 3. Specifically, piston 21a of first damping device 21 has the other end, or a piston rod, connected to one end of first casing 4a, or end 41a. Therefore, when first casing 4a receives an external force, it is transmitted to piston 21a. Piston 22a of second damping device 22 has the other end, or a piston rod, connected to the other end of second casing 4b, or end 42b. Therefore, when second casing 4b receives an external force, it is transmitted to piston 22a.

An end of cylinder 21b opposite to that thereof penetrated by a piston rod and an end of cylinder 22b opposite to that thereof penetrated by a piston rod are connected to coupling member 3. Thus, cylinder 21b of first damping device 21 and cylinder 22b of second damping device 22 are coupled to each other and operate in conjunction with each other while maintaining a predetermined distance. Thus, coupling member 3 transmits a force applied to first damping device 21 to second damping device 22, and transmits a force applied to second damping device 22 to first damping device 21. This configuration allows the base isolation unit to be capable of extension and contraction.

Figure 4:
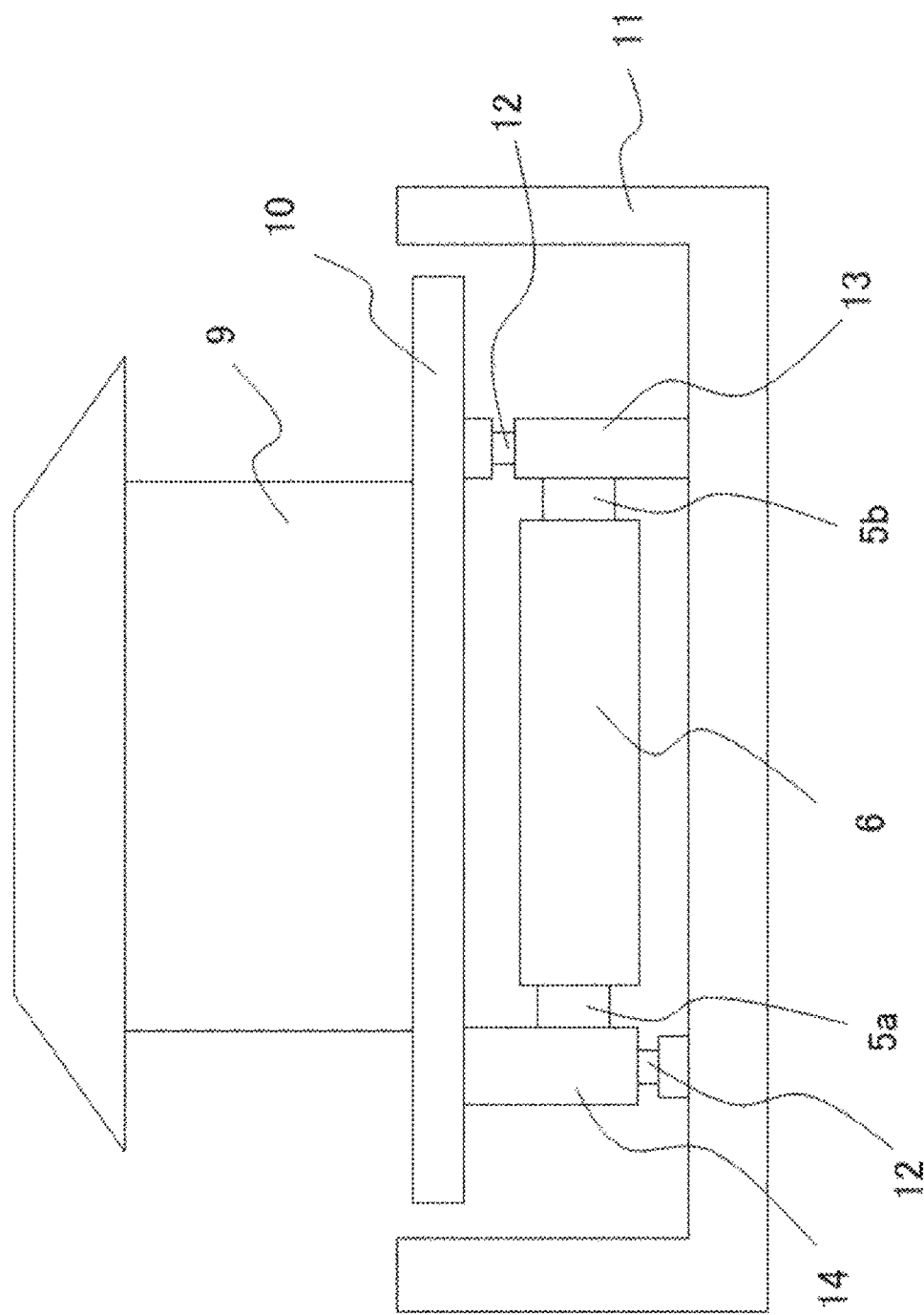
FIG. 4 schematically shows an exemplary configuration in which a base isolation apparatus including the base isolation unit according to the first embodiment of the present disclosure is applied to a base of an object to be isolated.

Hereinafter, an exemplary application of the base isolation unit shown in FIG. 2 will be described with reference to FIG. 4. FIG. 4 shows an exemplary configuration in which the base isolation unit shown in FIG. 2 is installed in one horizontal direction. While FIG. 4 shows the base isolation unit installed in one horizontal direction, that is, a first direction, in this exemplary configuration, another base isolation unit (not shown) is also installed in a direction intersecting the first direction in a horizontal plane, that is, a second direction. The second direction is preferably orthogonal to the first direction in the horizontal plane. That is, the exemplary configuration shown in FIG. 4 is a base isolation apparatus comprising: a first-direction base isolation unit that is the base isolation unit shown in FIG. 2 and connected to an object movably supported in a horizontal plane to be isolated with the first direction in the horizontal plane as a direction of base isolation; and a second-direction base isolation unit that is the base isolation unit shown in FIG. 2 and connected to the object to be isolated with the second direction different from the first direction in the horizontal plane as a direction of base isolation. For such a base isolation apparatus, two or more base isolation units may be installed in at least one of the first and second directions. In that case, a plurality of base isolation units may be installed so as to sandwich the object to be isolated. By increasing the number of base isolation units, a greater base isolation effect can be obtained.

As shown in FIG. 4, the base isolation unit is installed between a horizontal plate-shaped layer 10 to be isolated that is disposed under an object 9 to be isolated, such as a building or precision equipment, and a base 11 located on the side of the ground. Object 9 to be isolated is present on layer 10 to be isolated. FIG. 4 shows the base isolation unit scaled up. At an end of layer 10 to be isolated at which the base isolation unit is installed, a wall 13 is formed to project from base 11 toward layer 10 to be isolated. Further, at a location opposite to wall 13, a wall 14 is formed to project toward base 11 from layer 10 to be isolated. The base isolation unit is disposed to connect between walls 13 and 14 opposite to each other.

Note that a linear guide 12 is provided between wall 14 and base 11. Linear guide 12 is a guide mechanism that smoothly moves without being restrained in a horizontal direction. Linear guide 12 is also provided between wall 13 and layer 10 to be isolated. Other than linear guide 12, a sliding support may be used. For example, laminated rubber, a sliding bearing, a rolling bearing, or the like may be used.

For horizontal base isolation as shown in FIG. 4, walls 13 and 14 support the weight of object 9 to be isolated and layer 10 to be isolated via horizontal linear guide 12. With such a configuration, even when base 11 is shaken by an earthquake, vibration of object 9 to be isolated and layer 10 to be isolated is alleviated by the base isolation unit. As a result, layer 10 to be isolated and object 9 to be isolated are isolated from horizontal seismic vibration.

Furthermore, a plurality of base isolation units each shown in FIG. 2 may be combined to provide a base isolation apparatus. For example, it may be a base isolation apparatus (not shown) including base isolation units in a Z direction, an X direction, and a Y direction (three axial directions). The X direction is one direction in a horizontal plane, the Y direction is a direction orthogonal to the X direction in the horizontal plane, and the Z direction is a vertical direction. More specifically, it is a base isolation apparatus comprising: a vertical base isolation unit which is connected to an object to be isolated that is located thereabove, with a vertical direction as a direction of base isolation; a first-direction base isolation unit with a first direction in a horizontal plane as a direction of base isolation; and a second-direction base isolation unit with a second direction in the horizontal plane different from the first direction as a direction of base isolation. The first-direction base isolation unit and the second-direction base isolation unit are connected to the object to be isolated via the vertical base isolation unit.

The base isolation apparatus can implement a base isolation function against vertical vibration by the vertical base isolation unit. Further, the base isolation apparatus can implement a base isolation function against vibration in a first direction that is one direction in a horizontal plane. Further, the base isolation apparatus can implement a base isolation function against vibration in a second direction intersecting the first direction in the horizontal plane. In this way, a base isolation function can be implemented in three directions in a vertical direction and a horizontal plane. Base isolation units may be combined in two of the three directions to configure a base isolation apparatus. Alternatively, base isolation units may be combined in four or more directions rather than three directions.

Hereinafter, how the base isolation unit according to the present embodiment operates will be described with reference to FIGS. 5 to 7. FIG. 5(a) is a diagram showing a load transmission path on the side of first and second damping devices 21 and 22 when an external force in a compressive direction, which is a direction in which movement regulator 6 compresses, acts on the base isolation unit in the direction of base isolation. The compressive direction is indicated by an arrow 7. The load transmission path is indicated by a broken line.

When the compressive external force acts, piston 22a of second damping device 22 is pulled by second casing 4b. Piston 22a receives a load, which is in turn transmitted to coupling member 3 via cylinder 22b in contact with piston 22a. The load transmitted to coupling member 3 is transmitted from coupling member 3 to the first damping device 21 cylinder 21b followed by fluid 21c followed by piston 21a. That is, a tensile force is applied to second damping device 22. A pressing force is applied to first damping device 21.

FIG. 5(b) is a diagram showing a load transmission path on the side of vibration damper 1 when an external force in the compressive direction, which is the direction in which movement regulator 6 compresses, acts on the base isolation unit in the direction of base isolation. The load transmission path is indicated by a broken line. Vibration damper 1 receives a load in the compressive direction from second casing 4b.

FIG. 6(a) is a diagram showing a load transmission path on the side of first and second damping devices 21 and 22 when an external force in a tensile direction, which is a direction in which movement regulator 6 tensions, acts on the base isolation unit in the direction of base isolation. The tensile direction is indicated by an arrow 8. The load transmission path is indicated by a broken line. When the tensile external force acts, piston 22a of second damping device 22 is pressed by second casing 4b. Piston 22a receives a load which is in turn transmitted via piston 22a followed by fluid 22c followed by cylinder 22b to coupling member 3. From coupling member 3 the load is transmitted to the first damping device 21 cylinder 22b and piston 22a. That is, a pressing force is applied to second damping device 22. A tensile force is applied to first damping device 21.

FIG. 6(b) is a diagram showing a load transmission path on the side of vibration damper 1 when an external force in the tensile direction, which is the direction in which movement regulator 6 tensions, acts on the base isolation unit in the direction of base isolation. The load transmission path is indicated by a broken line. Vibration damper 1 receives a load in the tensile direction from second casing 4b.

Therefore, first damping device 21 receives a pressing force when an external force in a direction to decrease a distance between first connector 5a and second connector 5b (i.e., compressive force) is applied to the base isolation unit. Second damping device 22 receives a pressing force when an external force in a direction to increase a distance between first connector 5a and second connector 5b (i.e., tensile force) is applied to the base isolation unit.

Figure 7:
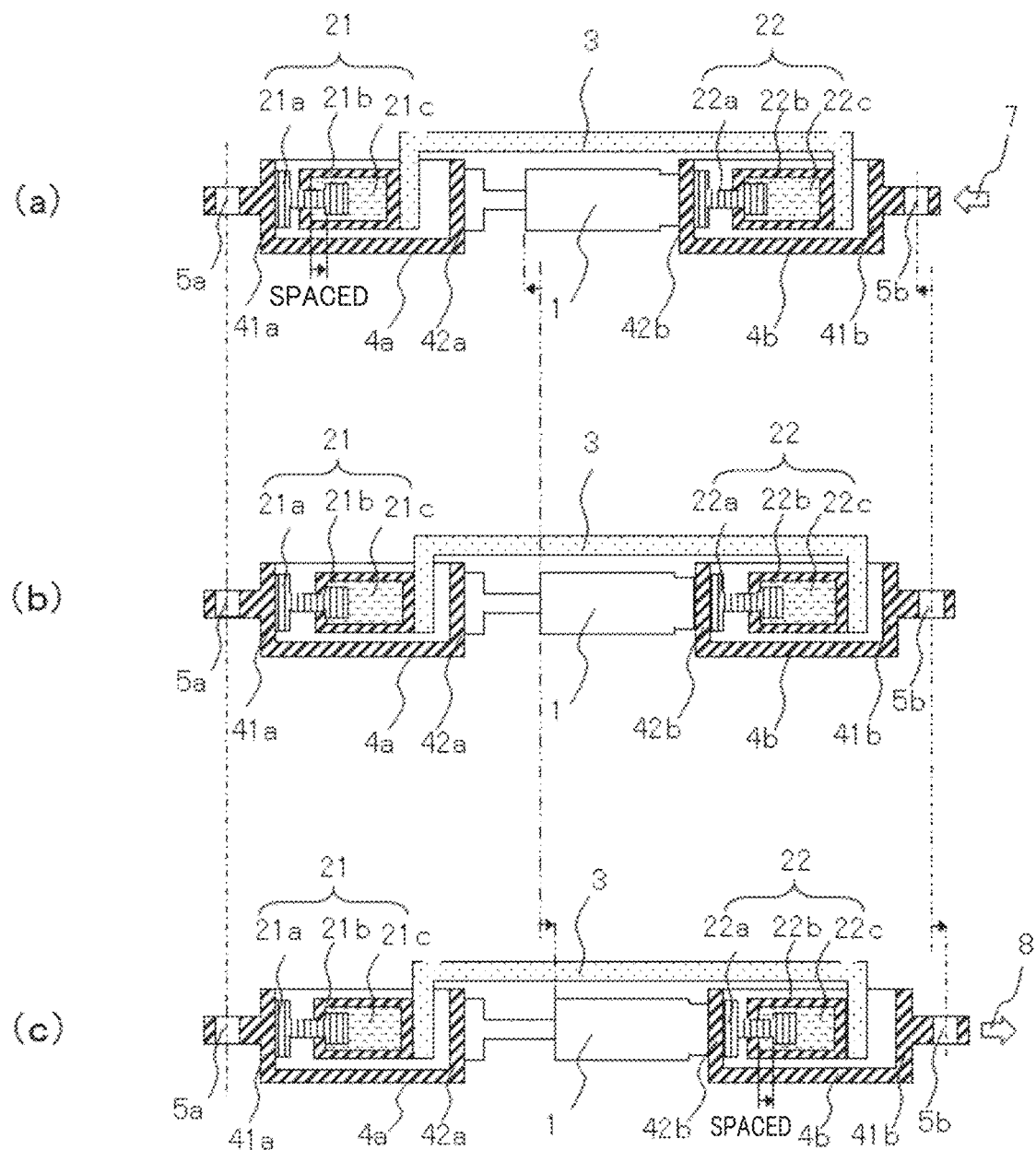
FIG. 7 is a schematic diagram for illustrating how the base isolation unit according to the first embodiment of the present disclosure operates in an earthquake.

FIG. 7 is a schematic diagram for illustrating how the base isolation unit operates during an earthquake. FIG. 7(a) shows a state in which a compressive external force is applied to the base isolation unit. FIG. 7(b) shows an initial position of the base isolation unit. FIG. 7(c) shows a state in which a tensile external force is applied to the base isolation unit. FIG. 7(b) shows an initial position of the base isolation unit in a normal state before it receives seismic vibration. When the base isolation unit assumes the initial position, one end of cylinder 21b of first damping device 21 is in contact with the piston head of piston 21a. Further, one end of cylinder 22b of second damping device 22 is in contact with the piston head of piston 22a. When the external force applied to the base isolation unit is equal to or smaller than the preload, then, as shown in FIG. 7(b), the base isolation unit does not move from the initial position and has a normally assumed length along the main axis.

As shown in FIG. 7(a), it is assumed that an external force larger than the preload force applied to first and second damping devices 21 and 22 is applied in the compressive direction to the base isolation unit. The compressive direction is indicated by arrow 7. When this is done, second casing 4b receives a load in the direction indicated by arrow 7 and piston 22a of second damping device 22 is pulled by second casing 4b, and accordingly, one end of cylinder 22b comes into contact with the piston head of piston 22a and second damping device 22 is not compressed. The load applied from second casing 4b to piston 22a is transmitted to coupling member 3 via cylinder 22b. The load is transmitted from coupling member 3 to cylinder 21b of first damping device 21, and a pressing force is applied to first damping device 21. When this pressing force exceeds the preload force applied to fluid 21c, fluid 22c is compressed, and one end of cylinder 21b is separated from the piston head of piston 21a. That is, piston 21a enters cylinder 21b, and first damping device 21 is compressed. At the same time, vibration damper 1 is compressed as it receives a pressing force applied from second casing 4b.

As a result, as shown in FIG. 7(a), second casing 4b moves toward first casing 4a. That is, movement regulator 6 is compressed, and a distance between first connector 5a and second connector 5b is decreased. When this is done, at first damping device 21, a recovering force to return piston 21a to its original position and a damping force in a direction to suppress movement of piston 21a work. At vibration damper 1, a damping force in a direction to suppress movement of second casing 4b works. Vibration damper 1 generates a large damping force which is in turn transmitted to connectors 5a and 5b via first and second casings 4a and 4b, and accordingly, there is no large load acting on first damping device 21.

As shown in FIG. 7(c), it is assumed that an external force in a tensile direction larger than the preload force applied to first and second damping devices 21 and 22 is applied to the base isolation unit. The tensile direction is indicated by arrow 8. When this is done, piston 22a of second damping device 22 receives a pressing force from second casing 4b. When the pressing force exceeds the preload force applied to fluid 22c, fluid 22c compresses, and one end of cylinder 22b is separated from the piston head of piston 22a. That is, piston 22a enters cylinder 22b, and second damping device 22 compresses. At the same time, vibration damper 1 tensions as a tensile force is applied from second casing 4b. The load applied from second casing 4b to piston 22a is transmitted via fluid 22c and cylinder 22b to coupling member 3. The load is transmitted from coupling member 3 to cylinder 21b of first damping device 21, and a tensile force is applied to first damping device 21. As piston 21a of first damping device 21 is pulled from coupling member 3, one end of cylinder 21b comes into contact with the piston head of piston 21a, and first damping device 21 is not compressed.

As a result, as shown in FIG. 7(c), second casing 4b moves away from first casing 4a. That is, movement regulator 6 is tensioned, and a distance between first connector 5a and second connector 5b is increased. When this is done, at second damping device 22, a recovering force to return piston 22a to its original position and a damping force in a direction to suppress movement of piston 22a work. At vibration damper 1, a damping force in a direction to suppress movement of second casing 4b works. Vibration damper 1 generates a large damping force which is in turn transmitted to connectors 5a and 5b via first and second casings 4a and 4b, and accordingly, there is no large load acting on second damping device 22.

That is, when an earthquake occurs, and an external force exceeding the preload force applied to first and second damping devices 21 and 22 is applied to the base isolation unit, vibration damper 1 and first and second damping devices 21 and 22 operate and movement regulator 6 is extended and contracted accordingly. In other words, first and second damping devices 21 and 22 serve as a separating mechanism that operates in response to both compressive external force and tensile external force. When the mechanism works, seismic vibration energy is absorbed by the damping force of vibration damper 1. This can suppress transmission of seismic vibration from second connector 5b to first connector 5a and the object to be isolated.

After the earthquake, by the recovering force of first and second damping devices 21 and 22, first and second casings 4a and 4b are returned to their initial positions assumed before the earthquake. The base isolation unit can thus implement a function to automatically recover to the initial position after the earthquake. Even when the base isolation unit encounters earthquakes one after another, the base isolation unit returns to the initial position after each earthquake, and the base isolation unit can move to a maximum stroke for each time.

Further, first and second damping devices 21 and 22 have a damping force in addition to a recovering force. When an earthquake occurs, a state when a compressive load acts, as shown in FIG. 7(a), and a state when a tensile load acts, as shown in FIG. 7(c), are repeated. When this is done, an impact load generated when one end of cylinder 21b (22b) separated from the piston head of piston 21a (22a) again comes into contact therewith can be suppressed by the damping force to be a small impact load. This can also suppress an impact load to be smaller than when a conventional base isolation apparatus has its disc spring or coil spring compressed and deformed, and returned to its initial position. This can eliminate the necessity of providing each of first and second damping devices 21 and 22 with a shock absorber capable of alleviating an impact load, and can thus prevent the devices from having an increased size.

When an external force such as external vibration from other than an earthquake does not exceed the preload force, the distance between first connector 5a and second connector 5b is maintained by movement regulator 6. Therefore, the distance between first connector 5a and second connector 5b does not vary, and the base isolation unit couples a structure shaken by an earthquake and the object to be isolated while maintaining large stiffness. As a result, while the base isolation unit allows a base isolation function to operate only when an earthquake occurs, normally the base isolation unit can maintain large stiffness.

Further, movement regulator 6 uses first and second damping devices 21 and 22 that are preload, and does not particularly have a device requiring a power source. Therefore, it is simpler in configuration than when a device requiring power source is used, and can reduce a probability of occurrence of failure. Furthermore, the base isolation unit is applicable even in an environment in which it is difficult to ensure a power source, such as a mountain top, or when a power failure occurs.

The base isolation unit according to the present disclosure is particularly effective when it is applied to precision instruments such as a telescope and an optical device as an object to be isolated. By using the base isolation unit according to the present disclosure, a structure including a precision instrument such as a telescope can be firmly connected to the ground so that normally an operation of the precision instrument, such as an observation operation, is not affected, whereas the structure can be isolated once an earthquake has occurred. That is, the base isolation unit can suppress transmission of seismic vibration to the precision instrument. Further, when an earthquake occurs, it is expected that a social infrastructure such as a power grid is damaged, and the base isolation unit may not be supplied with sufficient power. For such a situation, the base isolation unit according to the present disclosure that is composed only of mechanical elements such as first and second damping devices 21 and 22 can constantly be used whether the base isolation unit is supplied with power or not.

Furthermore, a linear encoder comprising a scanning head and a scale tape may be disposed to detect an angle about an azimuthal axis of the telescope. The base isolation unit according to the present disclosure has a function to automatically recover to an initial position, and thus allows the scanning head and the scale tape to have a relative positional relationship substantially free of displacement even after an earthquake, and observation to be resumed in a short period of time.

Second Embodiment

A base isolation unit according to a second embodiment of the present disclosure will be described with reference to FIG. 8. The base isolation unit according to the present embodiment is different from the base isolation unit according to the first embodiment in that the vibration-source connector, or second connector 5b, also functions as a positional and rotational displacement adjusting mechanism. The remainder in configuration is similar to that of the base isolation unit according to the first embodiment, and can obtain a similar effect.

Figure 8:
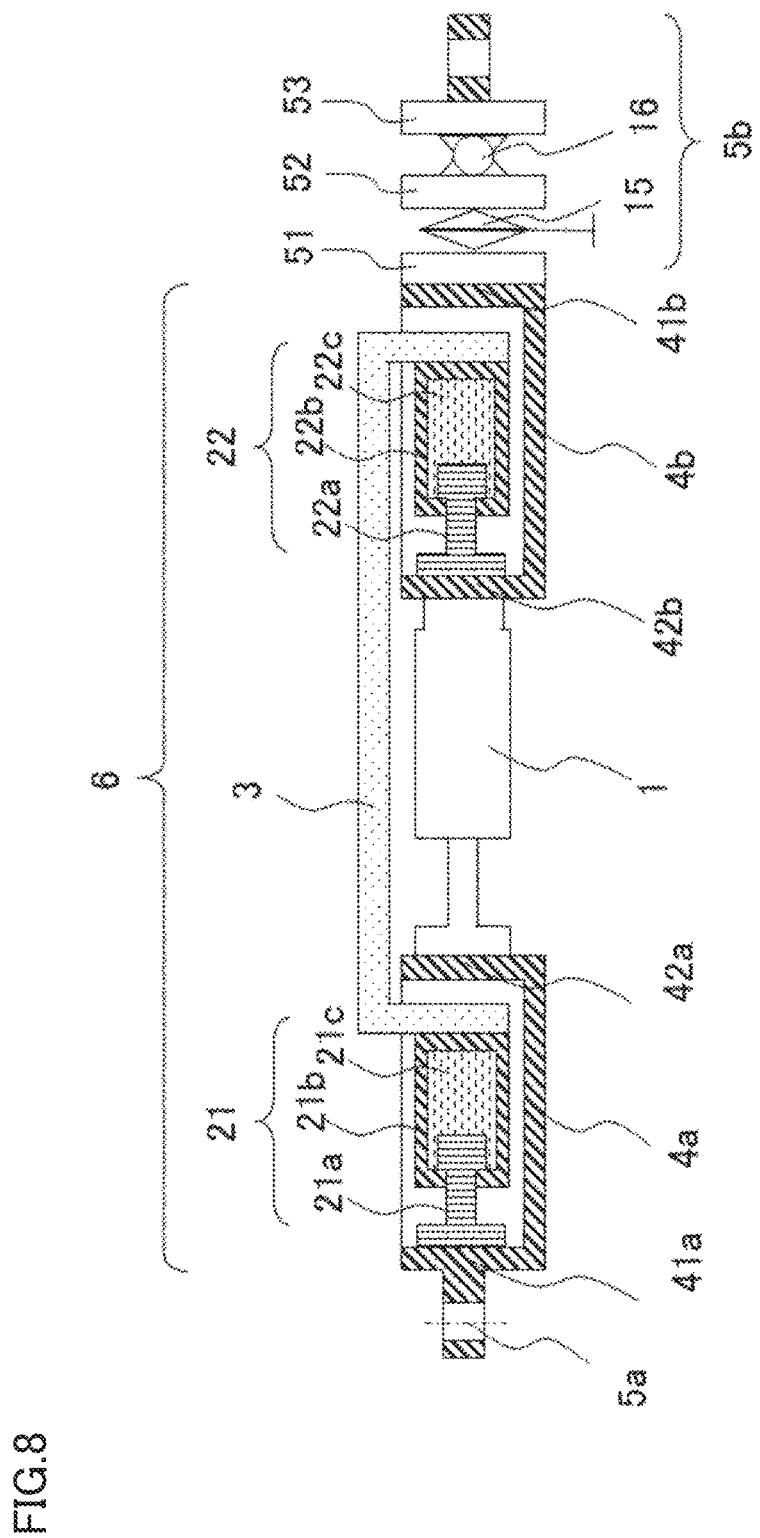
FIG. 8 is a cross section for illustrating how a base isolation unit according to a second embodiment of the present disclosure is structured and operates.

As shown in FIG. 8, second connector 5b includes a positional displacement adjusting mechanism 15 and a rotational displacement adjusting mechanism 16. Positional displacement adjusting mechanism 15 includes a support 51 that is a plate-shaped member, an intermediate plate 52 that is a plate-shaped member spaced from support 51, and a distance adjusting member that changes a distance between support 51 and intermediate plate 52. The distance between support 51 and intermediate plate 52 can be changed by the distance adjusting member. The distance adjusting member is, for example, a jack or a screw.

Rotational displacement adjusting mechanism 16 includes intermediate plate 52, a connector 53 disposed at a distance from intermediate plate 52, and a spherical bearing connecting intermediate plate 52 with connector 53 at a given angle. Such a second connector 5b allows the base isolation unit to be used with connector 53 adjusted with respect to the structure positionally appropriately for example at six degrees of freedom, and thus set. Thus, a counterforce caused as connector 53 restrains an object to be isolated can be prevented from having an effect on an object having small stiffness such as a precision instrument included in the object to be isolated. Rotational displacement adjusting mechanism 16 may be disposed on the side of movement regulator 6.

Positional displacement adjusting mechanism 15 and rotational displacement adjusting mechanism 16 may be provided on the side of first connector 5a, or may be provided at both first connector 5a and second connector 5b. From a different point of view, in the base isolation unit, at least one of first connector 5a and second connector 5b has connector 53 connected to an object to be connected in contact therewith, a member that renders variable a connection angle of a spherical bearing or the like acting as the connection position adjuster capable of adjusting connector 53 positionally and angularly with respect to movement regulator 6, and the distance adjusting member.

The base isolation unit of the present embodiment comprises positional displacement adjusting mechanism 15 and rotational displacement adjusting mechanism 16 serving as a connection position adjuster, so that an object to be isolated is supported without being affected by counterforce, and a precision instrument with small stiffness can also be an object to be isolated.

It should be understood that the embodiments disclosed herein have been described for the purpose of illustration only and in a non-restrictive manner in any respect. The scope of the present disclosure is defined by the terms of the claims, rather than the description above, and is intended to include any modifications within the meaning and scope equivalent to the terms of the claims.

REFERENCE SIGNS LIST 1 vibration damper, 21 first damping device, 22 second damping device, 21a, 22a piston, 21b, 22b cylinder, 21c, 22c fluid, 3 coupling member, 4a first casing, 4b second casing, 5a first connector, 5b second connector, 6 movement regulator, 6a stiffness when compressive load equal to or smaller than preload force acts, 6b stiffness when compressive load exceeding preload force acts, 6c stiffness when tensile load acts, 7 compressive direction, 8 tensile direction, 9 object to be isolated, 10 layer to be isolated, 11 base, 12 linear guide, 13, 14 wall, 15 positional displacement adjusting mechanism, 16 rotational displacement adjusting mechanism, 51 support, 52 intermediate plate, 53 connector.

The invention claimed is:

1. A base isolation unit comprising:
a first connector and a second connector disposed in a direction of base isolation with a predetermined distance therebetween; and
a movement regulator provided between the first connector and the second connector and receiving an external force in the direction of base isolation,
the movement regulator including a first casing having one end connected to the first connector, a second casing having one end connected to the second connector, a first damping device accommodated inside the first casing, a second damping device accommodated inside the second casing, a vibration damper provided between the first casing and the second casing and generating a force in a direction to decrease the distance between the first connector and the second connector when the distance increases and generating a force in a direction to increase the distance when the distance decreases, and a coupling member coupling the first damping device and the second damping device together,
the first and second damping devices each having a cylinder having opposite ends closed, a compressible fluid sealed inside the cylinder and preloaded, and a piston penetrating through one end of the cylinder, having one end located inside the cylinder and the other end located outside the cylinder, and raising the fluid in pressure as the piston enters the cylinder,
the first and second damping devices having their respective cylinders connected to the coupling member,
the other end of the piston of the first damping device being connected to the one end of the first casing,
the other end of the piston of the second damping device being connected to the other end of the second casing.

2. The base isolation unit according to claim 1, wherein the other end of the cylinder of the first damping device and the other end of the cylinder of the second damping device are connected to the coupling member.

3. The base isolation unit according to claim 1, wherein at least one of the first connector and the second connector has a connector connected to an object to be connected in contact with the object, and a connection position adjuster configured for of adjusting the connector positionally and angularly with respect to the movement regulator.

4. A base isolation apparatus comprising:
   a first-direction base isolation unit that is the base isolation unit according to claim 1 connected to an object movably supported in a horizontal plane to be isolated with a first direction in the horizontal plane as the direction of base isolation; and
   a second-direction base isolation unit that is another said base isolation unit according to claim I connected to the object to be isolated with a second direction in the horizontal plane different from the first direction as the direction of base isolation.

5. A base isolation apparatus comprising: p1 a vertical base isolation unit that is the base isolation unit according to claim 1, and isolates an object located thereabove, with a vertical direction as the direction of base isolation;
   a first-direction base isolation unit that is another base isolation unit according to claim 1, and connected to the object to be isolated via the vertical base isolation unit, with a first direction in a horizontal plane as the direction of base isolation; and
   a second-direction base isolation unit that is yet another said base isolation unit according to claim 1, and connected to the object to be isolated via the vertical base isolation unit, with a second direction in the horizontal plane different from the first direction as the direction of base isolation.

6. The base isolation unit according to claim 2, wherein at least one of the first connector and the second connector has a connector connected to an object to be connected in contact with the object, and a connection position adjuster configured for adjusting the connector positionally and angularly with respect to the movement regulator.

* * * * *